United States Patent [19]

Sextro et al.

[11] 4,024,105

[45] May 17, 1977

[54] PROCESS FOR PREPARING A STABILIZED OXYMETHYLENE COPOLYMER

[75] Inventors: Günter Sextro; Karlheinz Burg, both of Naurod, Taunus; Ernst Wolters, Frankfurt am Main, all of Germany

[73] Assignee: Hoechst Aktiengesellschaft, Frankfurt am Main, Germany

[22] Filed: Feb. 20, 1975

[21] Appl. No.: 551,235

[30] Foreign Application Priority Data

Feb. 22, 1974 Germany .......................... 2408481

[52] U.S. Cl. ................... 260/45.85 R; 260/45.9 P; 260/67 FP; 260/45.85 T
[51] Int. Cl.² ...................... C08G 2/32; C08G 2/10
[58] Field of Search ............ 260/45.85 R, 45.85 T, 260/67 FP, 45.9 P

[56] References Cited

UNITED STATES PATENTS

| | | | |
|---|---|---|---|
| 3,219,623 | 11/1965 | Berardinelli | 260/45.95 |
| 3,340,219 | 9/1967 | Stemmler | 260/45.85 R X |
| 3,484,400 | 12/1969 | Haley | 260/45.85 R X |
| 3,505,292 | 4/1970 | Smith et al. | 260/67 FP |
| 3,524,832 | 8/1970 | Green | 260/45.9 P |
| 3,626,024 | 12/1971 | Gutweiler et al. | 260/45.9 P X |
| 3,699,062 | 10/1972 | Starr et al. | 260/45.9 P X |

*Primary Examiner*—Lucille M. Phynes
*Attorney, Agent, or Firm*—Curtis, Morris & Safford

[57] ABSTRACT

Oxymethylene copolymer having heat and hydrolysis resistant terminal groups is prepared by heating the polymers present in a liquid phase, whereby a thermal degradation of the unstable terminal groups takes place. The degradation is advantageously effected in the presence of a calcium or magnesium salt of an aliphatic carboxylic acid of low molecular weight. The oxymethylene copolymers are suitable as engineering plastic for preparing semi-finished products and finished products.

9 Claims, No Drawings

PROCESS FOR PREPARING A STABILIZED OXYMETHYLENE COPOLYMER

It is already known to stabilize oxymethylene copolymers containing in the main valence chain besides oxymethylene units also oxyalkylene units having at least 2 adjacent carbon atoms by thermal treatment in the presence or absence of a liquid hydrolyzing agent (cf. U.S. Pat. Nos. 3,103,499 and 3,219,263). In this process a thermal degradation of unstable terminal groups in a non-acid medium takes place.

It is moreover known that a stabilizing degradation of oxymethylene copolymers may also be effected under slightly acid conditions being assured by buffer systems (cf. U.S. Pat Nos. 3,640,945 and 3,756,985).

Finally there are known polyacetal materials containing as heat stabilizers certain carboxylic acids salts and magnesium or strontium, which materials are prepared by mixing the components present in a solid state (cf. Japanese Specification No. 72-10.531). In said specification it is pointed out that the use of carboxylic acid salts having less than 6 carbon atoms is disadvantageous, since said salts accelerate decomposition of the polyacetal.

The invention relates to a process for preparing an oxymethylene copolymer having heat and hydrolysis resistant terminal groups by heating a copolymer consisting of from 80 to 99.9% by weight of a cyclic oligomer of formaldehyde and of from 20 to 0.1% by weight of a compound capable of being copolymerized with said oligomer and forming monomer units having from 2 to 8 adjacent carbon atoms, in liquid phase, which comprises heating the copolymer in the presence of at least one magnesium or calcium salt of a mono- or dicarboxylic acid having 3, 4 or 5 carbon atoms under pressure above the atmospheric pressure in the absence of oxygen, and optionally mixing it homogeneously in the molten state with a heat, oxidation or light stabilizer.

The invention particularily comprises using as magnesium or calcium salt of a mono- or dicarboxylic acid having 3,4 or 5 carbon atoms a magnesium or calcium salt of a carboxylic acid of the formula

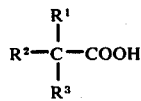

wherein $R^1$ is a hydrogen atom, a carboxy group, an alkyl group or a carboxyalkyl group, $R^2$ is a hydrogen atom, a hydroxy group, an alkyl group or a hydroxyalkyl group and $R^3$ represents a hydrogen atom, an alkyl group or a hydroxyalkyl group, the sum of the carbon atoms being 3,4 or 5.

The term oxymethylene copolymers signifies polyoxymethylenes containing in the main valence chain oxyalkylene groups having from 2 to 8, preferably 2,3 or 4 adjacent carbon atoms. These oxymethylene copolymers are prepared by catonic copolymerization of a cyclico ligomer of formaldehyde, preferably of 1,3,5-trioxane, with a cyclic ether, a cyclic acetal or a linear polyacetal. Suitable compounds reacting as comonomers are especially cyclic ethers having 3, 4 or 5 ring members, preferably epoxides, furthermore cyclic acetals having from 5 to 11, preferably from 5 to 8 ring members, especially cyclic formulas of $\alpha,\omega$-diols having from 2 to 8, preferably 2, 3 or 4 carbon atoms in the chain, the carbon atoms chain of which formals is optionally interrupted by an oxygen atom at intervals of 2 carbon atoms, as well as linear polyformals.

Compounds of the formula

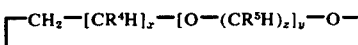

are especially appropriate, wherein
1. $R^4$ and $R^5$ are identical or different and each represents a hydrogen atom, an aliphatic alkyl radical having from 1 to 6, preferably 1, 2, 3 or 4 carbon atoms or a phenyl radical, and
   a. $x$ is 1, 2, or 3 and $y$ is zero, or
   b. $x$ is zero, $y$ is 1, 2 or 3 and $z$ is 2, or
   c. $x$ is zero, $y$ is 1 and $z$ is 3, 4, 5, or 6, or
2. $R^4$ means an alkoxymethyl radical having from 2 to 6 carbon atoms, preferably 2, 3 or 4 carbon atoms or a phenoxymethyl radical, $x$ being 1 and $y$ being zero and $R^5$ having the above meaning.

Examples of cyclic ethers used are ethylene oxide and epichlorohydrine as well as propylene oxide, styrene oxide, cyclohexane oxide, oxacyclobutane and phenyl glycidyl ether, and suitable cyclic formals are, for example 1,3 dioxolane, 1,3 dioxane 1,3-dioxepane and 1,3,6-trioxocane as well as 4-methyl-1,3-dioxolane, 4-phenyl-1,3-dioxolane, 1,3-dioxonane and 1,3,-dioxacycloheptene-(5).

Suitable linear polyformals are especially poly(1,3-dioxolane) and poly (1,3-dioxepane).

The oxymethylene copolymers are prepared in known manner by polymerizing the monomers in bulk, suspension or solution in the presence of cationically acting catalysts at a temperatureof from 0° to 100° C, preferably from 50° to 90° C. (Cf. U.S. Pat. No. 3.027.352 = German Auslegeschrift No, 1.420.283).

The cationically acting catalysts used are
1. protonic acids such as perchloric acid,
2. esters of protonic acids, especially esters of the perchloric acid with aliphatic alcohols of low molecular weight such as perchloric acid tertiary butyl ester,
3. anhydrides of protonic acids, especially mixed anhydrides of the perchloric acid and an aliphatic acid of low molecular weight such as acetyl perchlorate,
4. Lewis acids, especially halides of boron, tin, titanium, phosphorus, arsenic and antimony such as borontrifluoride, tin tetrachloride, titanium tetrachloride, phosphorous pentachloride, phosphorus pentafluoride and antimony pentafluoride and arsenic pentafluoride and
5. complex compounds or salt-like compounds, preferably etherates or onium salts of Lewis acids such as borontrifluoride diethyletherate, borontrifluoride-di-n-butyletherate, triethyloxonium tetrafluoroborate, trimethyloxonium hexafluorphosphate, triphenylmethyl hexafluoroarsenate, acetyltetrafluoroborate, acetylhexafluorophosphate and acetylhexafluoroarsenate.

The quantity of the catalysts used in the copolymerization depends above all on their efficiency, they are generally used in a quantity of from 0.1 to 2.000, preferably of from 0.2 to 500 ppm, calculated on the total quantity of the compounds to be polymerized. Very efficient catalysts such as borontrifluoride are advantageously used in an amount of from 10 to 150, preferably of from 20 to 100 ppm calculated on the total quantity of the compounds to be polymerized. For complex compounds or salt-like compounds of said catalysts the corresponding molar quantities are to be used. Rather vigorously acting catalysts such as perchloric acid are used in an amount of from 0.2 to 10, preferably of from 0.3 to 5 ppm.

It is recommended generally to use the catalysts in a diluted form. Gaseous catalysts are diluted with an inert gas, e.g. nitrogen and noble gases such as argon, whereas liquid or solid catalysts are dissolved in an inert solvent. Suitable solvents are especially aliphatic or cycloaliphatic hydrocarbons as well as nitrated aliphatic or aromatic hydrocarbons. Examples thereof are cyclohexane, methylene chloride, ethylene chloride, nitrobenzene. The weight ratio of catalyst to diluent usually ranges from 1:5 to 1:10000, preferably of from 1:10 to 1:100. Very strongly acting catalysts are advantageously diluted in a proportion of from 1:5,000 to 1:20,000.

The polymerization is advantageously carried out in an inert gas atmosphere with exclusion of humidity. Suitable inert gases for example are noble gases such as argon as well as nitrogen.

For preparing polymers of a molecular weight in a definite range it is advantageous to carry out polymerization in the presence of a regulator. For this purpose there may be used especially formaldehyde dialkylacetals having from 3 to 9, preferably from 3 to 5 carbon atoms such as formaldehyde dimethylacetal, diethylacetal, dipropyl acetal, and dibutylacetal, furthermore aliphatic alcohols of low molecular weight preferably alkanols having from 1 to 4 carbon atoms such as methanol, ethanol, propanol and butanol. The regulator is usually used in an amount up to 0.5% by weight, preferably from 0.005 to 0.1% by weight, calculated on the total quantity of the monomers.

The process according to the invention for thermally degrading unstable terminal groups of oxymethylene copolymers is carried out in liquid phase, preferably solution. The solvents used are especially mixtures of water and aliphatic alcohols of low molecular weight. The water content of the mixtures varies from 10 to 90, preferably from 20 to 70% by weight, whereas the quantity of the alcohol varies from 90 to 10, preferably from 80 to 30% by weight. Suitable alkanols are especially alkanols having from 1 to 4 carbon atoms such as methanol, ethanol, propanol and isopropanol. Mixtures of these alcohols may likewise be used as alcohol component of the solvent.

Examples of salts used according to the invention are magnesium or calcium salts of propionic acid, butyric acid, isobutyric acid, α-methyl butyric acid, valeric acid, isovaleric acid, pivalic acid and caproic acid as well as of malonic acid, succinic acid and glutaric acid. Besides the aforesaid salts of mono- or dicarboxylic acids there may be used especially magnesium or calcium salts of mono- or bivalent hydroxcarboxylic acids having 3, 4 or 5 carbon atoms such as the salts of lactic acid, β-hydroxypropionic acid, α-,β- or γ-hydroxybutyric acid, hydroxypivalic acid or of tartronic acid, malic acid and tartaric acid.

The quantity of the magnesium or calcium salt used according to the invention generally varies from 100 to 2,500 ppm, preferably from 300 to 1,000 ppm, calculated on the total weight of the oxymethylene copolymer and the slovent.

The process according to the invention is advantageously carried out under non-acid conditions. It is therefore recommended to adjust the reaction medium to a pH value from 7 to 11, preferably of from 7 to 9 (measured by means of a glass electrode at a temperature of 25° C). The pH is adjusted by the addition of magnesium oxide, magnesium hydroxide, calcium oxide or calcium hydroxide, preferably in the form of a concentrated aqueous solution. The quantity to be used is maximally 0.5, preferably maximally 0.25 mole per mole of the organic magnesium or calcium salt.

The proportion of the dissolved polymer in the treatment of the oxymethylene copolymers according to the invention in solution ranges from 1 to 50, preferably from 5 to 25% by weight, calculated on the total mixture. The thermal degradation is effected at a pressure of from 4 to 40 kg/cm², the temperature is in the range of from 130° to 200° C, preferably from 140° to 190° C and the thermal treatment is effected for a period of from 10 seconds to 2 hours depending on the temperature, preferably from 1 minute to 60 minutes. The higher the temperature, the shorter may be the residence time. A period of from about 1 to 2 minutes is sufficient at a temperature of 180° C, a period of from about 5 to 10 minutes at a temperature of 160° C, a period of from about 10 to 30 minutes at a temperature of 150° C, and a period of from about 20 to 60 minutes at a temperature of 140° C. A substantial condition therefore is that the polymer is present in a liquid phase and that the treatment is carried out in the absence of oxygen.

The oxymethylene copolymers prepared according to the invention are macromolecular. They have reduced specific viscosity (RSV), measured at 140° C in a 0.5% by weight solution of the polymer in γ-butyrolactone containing as stabilizer 2% by weight of diphenylamine, of from 0.3 to 3.0, preferably of from 0.5 to 2 dl/g. The crystallite melting points of the aforesaid oxymethylene copolymers are in the range of from 150 to 180° C and their melt indices $i_2$ are in the range of from 0.1 to 50, preferably from 1 to 30 g/10 minutes, measured at a temperature of 190° C according to DIN (= German Industrial Standard) 53,735, the load being 2.16 kg.

The oxymethylene copolymers treated according to the invention may be stabilized additionally by mixing them homogeneously with stabilizers against the action of the heat, oxygen and/or light. The homogenization usually is effected in a commercially available mixing device, for example, an extruder, a at a temperature above the melting point of the polymer up to 250° C, preferably of from 180 to 210° C. The quantity of the added stabilizers ranges from 0.1 to 10, preferably from 0.5 to 5% by weight, calculated on the total mixture.

Suitable stabilizers are above all bisphenol compounds, salts of the alkaline earth metals of carboxylic acids as well as guanidine compounds. The bisphenol compounds used are essentially esters or araliphatic or aromatic carboxylic acids substituted in the nucleus, preferably compounds of the formula

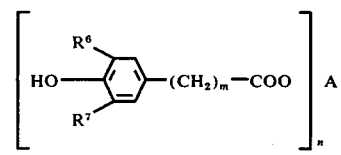

wherein $R^6$ is an alkyl radical having from 1 to 6 carbon atoms, $R^7$ is a hydrogen atom or an alkyl radical having from 1 to 6 carbon atom and A means a bi- to hexavalent aliphatic hydrocarbon radical, m is zero or an integer from 1 to 6 and n has the same valency as A. Especially suitable are esters of araliphatic or aromatic monocarboxylic acids having from 7 to 13, preferably 7, 8 or 9 carbon atoms, the aromatic nucleus of which acids being substituted in 4-position by a hydroxy group and in 3- or in 3- and 5-position each time by an aliphatic alkyl radical having 1, 2, 3 or 4 carbon atoms and esters of straight chain or branched aliphatic bi-, tri- or tetravalent alcohols such as esters of the ω-(3-tertiary butyl -4-hydroxy-phenyl)-pentanoic acid, β-(3-methyl-5-teriary butyl-4-hydroxyphenyl)-propionic acid, 3,5-ditertiary butyl-4hydroxybenzoic acid, (3,5-ditertiary butyl-4-hydroxyphenyl)-acetic acid, β(-3,5-ditertiary butyl-4-hydroxyphenyl )-propionic acid or (3,5-di-isopropyl-4-hydroxphenyl)-acetic acid with ethylene glycol, propane diol-(1,2) propane diol-(1,3), butane diol-(1,4), hexane diol-(1,6), decane diol-(1,10), 1,1,1-trimethylol ethane or pentaerythritol.

Suitable salts of alkaline earth metals are especially magnesium, calcium, strontium and barium salts of 1. saturated or unsaturated aliphatic mono-, di- or tricarboxylic acids having from 2 to 9, preferably from 3 to 7 carbon atoms such as acetic acid, propionic acid, butyric acid, valeric acid, caproic acid, enanthic acid, caprylic acid and pelargonic acid, moreover oxalic acid, malonic acid, succinic acid, glutaric acid, adipic acid and suberic acid, as well as acrylic acid, methacrylic acid, crotonic acid, isocrotonic acid, Angelic acid and tiglic acid or of 2. araliphatic carboxylic acids having from 7 to 9 carbon atoms such as phenyl acetic acid and cinnamic acid, or of 3. aromatic carboxylic acids having from 7 to 9 carbon atoms such as benzoic acid.

The alkaline earth metal salts of mono-, bi- or tribasic hydroxycarboxylic acids having from 2 to 9, preferably from 3 to 7 carbon atoms such as the calcium and magnesium salts of lactic acid, mandelic acid, malic acid, citric acid and hydroxypivalic acid as well as of salicylic acid are especially suitable.

The guanidine compounds used are compounds of the formula

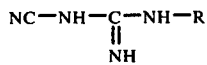

wherein R is a hydrogen atom, a cyano group, an alkyl radical having from 1 to 12, preferably from 1 to 6 carbon atoms, a cycloalkylradical having from 6 to 12, preferably 6, 7 or 8 carbon atoms, or an aryl radical having from 6 to 12, preferably, 6, 7 or 8 carbon atoms, the aforesaid alkyl, cycloalkyl or aryl radical being optionally substituted each by one, two or three hydroxy groups, such as cyanoguanidine N-cyano-N'-methyl-guanidine, N-cyano-N'-ethylguanidine, N-cyano- N'-isopropylguanidine, N-cyano-N'-tertiary butylguandine, N-cyano-N'-dodecylguanidine, N-cyano-N'-cyclohexylguanidine, N-cyano-N'-benzylguanidine, N-cyano-N'-phentlguanidine, N'-cyano-N'-hydroxy-methylguanidine, N-cyano-N'-(2-hydroxyethyl) guanidine or N,N'-dicyanoguanidine. The guanidine compound is optionally used in an amount of from 1.01 to 1, preferably from 0.1 to 0.5% by weight, calculated on the total mixture. Moreover there may be added to the oxymethylene copolymer prepared according to the invention known light stabilizers such as derivatives of benzophenone, acetophenone or triazine. Further additives such as dyestuffs, pigments, reinforcing materials and fillers may also be added.

The products obtained according to the invention are pure white and odorless and are distinguished by a very high thermostability. The magnesium and calcium salts used according to the invention are of a very low toxicity and may be decomposed biologically. It is not necessary to remove them from the oxymethylene copolymer.

The oxymethylene copolymers may be processed by all methods usually used for thermoplastics, for example by injection molding, extrusion, blowing of extruded materials, melt spinning and deep drawing. They are suitable for preparing semi-finished products and finished products such as molded articles, for example bars, rods, plates, ribbons, bristles, threads, fibres, films, sheets, tubes and flexible tubes, as well as household articles such as dishes and cups, and parts of a machine such as casings and gear wheels. They may be used especially as engineering plastic for preparing dimensionally stable molded parts holding to shape and having a smooth surface free from streaks.

The following examples illustrate the invention.

EXAMPLES 1 to 13 a. The oxymethylene copolymer to be stabilized according to the invention was prepared by polymerization of a mixture of 98% by weight of trioxane and 2% by weight of ethylene oxide at a temperature of 70° C under a nitrogen atmosphere. The catalsyt used was borontrifluoride-di-n-butyletherate in the form of a 2.5% by volume solution in cyclohexane added in an amount of 0.3 ml per 100 g of the monomer mixture. The polymerization mixture was cooled to 0° C after a polymerization period of about 30 minutes. The crude polymer obtained was ground giving fine powder, which contained 4.2% by weight of unstable portions.

b. In each example 150 g of the powdery crude polymer was mixed in a 3 liter autoclave with 1.28 1 of methanol, 0.68 1 of water and the quantity of a magnesium or calcium salt indicated in the table. A clear solution saturated while still cold of magnesium hydroxide or calcium hydroxyde was added optionally in order to adjust the pH to a specific value, the quantity of water required for this purpose being contained in the aforesaid quantity of 0.68 1. The autoclave was then flushed with nitrogen and the mixture was heated to a temperature of 150° C while vigorously stirring and this temperature was maintained for 15 minutes. Thereafter the solution obtained was permitted to cool to room temperature while it was stirred vigorously. The polymer precipitating in this process in a finely divided form was separated from the solvent by filtering off with suction and dried without intermediate washing in a vacuum shelf dryer in a slight nitrogen current at a temperature of 70° C and a pressure of 0.2 bar. The yields were in the range of from 86 to 88% by weight calculated on the crude polymer used.

c. The reduced specific viscosity and the thermal stability of the oxymethylene copolymer obtained were determined. Samples of the polymer were heated in a furnace under a nitrogen atmosphere for 2 hours to a temperature of 220° C in order to determine their thermal stability in the absence of oxygen. The loss of weight (I) obtained in this process was a measure for their stability. Further samples were made molten in a Brabender plastograph with 0.5% by weight of 1,6-bis [β-(3,5-di-tertiary butyl-4-hydroxyphenyl)-propionyloxy]-hexane, 0.1by weight of calcium lactate and 0.02% by weight of dicyanodiamide, each calculated on the total mixture, at a temperature of 190° C and kneaded for 5 minutes. The weight loss (II) of the samples after heating them for 2 hours in a furnace in air to a temperature of 230° C was taken as a measure for determining their thermal stability in the presence of oxygen. The results are shown in the following table.

Comparative examples A to D

The aforesaid oxymethylene copolymer was treated with known additives and tested under the same conditions as in examples 1 to 13. The following table shows the results. In comparative example A the pH was adjusted by the addition of n/2 sulfuric acid.

TABLE

| ex. | additive (ppm) | pH-value prior to degradation | loss of weight (%) I | loss of weight (%) II | color after II | RSV (dl/g) |
|---|---|---|---|---|---|---|
| A | 500 sodium fluoride + sulfuric acid | 6.5 | 9.5 | 6.7 | ivory | 0.72 |
| B | 500 triethylamine | 10.9 | 12.3 | 3.2 | ivory | 0.70 |
| C | 500 calcium hydroxide | 11.6 | 5.3 | 5.2 | dark-brown | 0.69 |
| D | 500 sodium carbonate | 11.3 | 4.2 | 11.4 | brown | 0.71 |
| 1 | 125 calcium lactate | 7.1 | — | 4.0 | ivory | 0.60 |
| 2 | 300 calcium lactate | 7.4 | — | 3.3 | ivory | 0.73 |
| 3 | 500 calcium lactate | 7.3 | 0.38 | 3.2 | ivory | 0.71 |
| 4 | 750 calcium lactate | 7.5 | — | 3.0 | ivory | 0.73 |
| 5 | 1000 calcium lactate | 7.5 | 0.38 | 3.2 | ivory | 0.73 |
| 6 | 125 calcium lactate + calcium hydroxide | 8.1 | — | 3.9 | ivory | 0.64 |
| 7 | 300 calcium lactate + calcium hydroxide | 9.8 | — | 3.2 | ivory | 0.71 |
| 8 | 500 calcium lactate + calcium hydroxide | 10.0 | 0.78 | 3.3 | ivory | 0.75 |
| 9 | 1000 calcium lactate + calcium hydroxide | 10.8 | — | 2.9 | beige | 0.72 |
| 10 | 750 magnesium lactate + magnesium hydroxide | 7.3 | — | 3.2 | ivory | 0.68 |
| 11 | 500 calcium malonate + calcium hydroxide | 7.8 | 0.9 | 3.4 | ivory | 0.74 |
| 12 | 500 calcium propionate + calcium hydroxide | 8.6 | — | 2.8 | ivory | 0.71 |
| 13 | 500 calcium butyrate | 7.5 | — | 3.0 | ivory | 0.74 |

What is claimed is:

1. A process for preparing an oxymethylene copolymer having heat and hydrolysis resistant terminal groups by heating a copolymer consisting of from 80 to 99.9% by weight of units derived from cyclic oligomer of formaldehyde and from 20 to 0.1% by weight of units derived from a compound capable of being copolymerized with the said oligomer and forming monomer units having from 2 to 8 adjacent carbon atoms, which comprises heating the copolymer in a liquid phase at a temperature of 130° to 200° C. in the presence of 100 to 2,500 ppm, based on the total weight of said liquid phase, of at least one magnesium or calcium salt of a mono- or dicarboxylic acid having 3, 4 or 5 carbon atoms at a pressure above atmospheric pressure in the absence of oxygen.

2. Process as claimed in claim 1, which comprises using as magnesium or calcium salt of a mono- or dicarboxylic acid having 3,4 or 5 carbon atoms a magnesium or calcium salt of a carboxylic acid of the formula

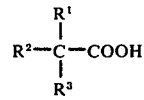

wherein $R^1$ is a hydrogen atom, a carboxy group, an alkyl group or a carboxyalkyl group, $R^2$ is a hydrogen atom, a hydroxy group an alkyl group or a hdroxyalkyl group and $R^3$ is a hydrogen atom, an alkyl group or a hydroxyalkyl group, the sum of the carbon atoms being 3, 4 or 5.

3. Process as claimed in claim 1, which comprises using as magnesium or calcium salt of a mono- or dicarboxylic acid having 3, 4 or 5 carbon atoms a magnesium or calcium salt of a mono- or dicarboxylic acid having 3, 4 or 5 carbon atoms and containing one or two hydroxy groups.

4. Process as claimed in claim 1, which comprises using as compound capable of being copolymerized with the oligomer of formaldehyde a compound of formula

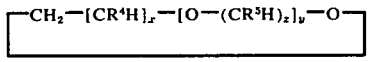

wherein
1. $R^4$ and $R^5$ are identical of different and each mean a hydrogen atom, an aliphatic alkyl radical having from 1 to 6 carbon atoms or a phenyl radical and
   a. $x$ is 1, 2 or 3 and $y$ is zero, or
   b. $x$ is zero, $y$ is 1, 2 or 3 and $z$ is 2, or
   c. $x$ is zero, $y$ is 1 and $z$ is 3, 4, 5 or 6, or
2. $R^4$ is an alkoxymethyl radical having from 2 to 6 carbon atoms or a phenoxymethyl radical, $x$ being 1 and $y$ zero and $R^5$ having the above meaning.

5. A process according to claim 1 wherein the oxymethylene copolymer having heat and hydrolysis resistant terminal groups is mixed in the molten state with a heat, oxidation or light stabilizer.

6. Process as claimed in claim 5, which comprises a using as heat stabilizer a compound of the formula

wherein R is a hydrogen atom, a cyano group, an alkyl radical having from 1 to 12 carbon atoms, a cycloalkyl radical having from 6 to 12 carbon atoms or an aryl radical having from 6 to 12 carbon atoms, the aforesaid alkyl, cycloalkyl ar aryl radical being optionally substituted by 1, 2 or 3 hydroxy groups.

7. Process as claimed in claim 5, which comprises using as heat stabilizer an alkaline earth metal salt of a multivalent hydroxycarboxylic acid having from 2 to 9 carbon atoms.

8. Process as claimed in claim 5, which comprises using as oxidation stabilizer a compound of the formula

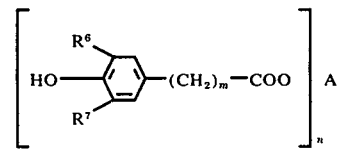

wherein $R^6$ is an alkyl radical having from 1 to 6 carbon atoms, $R^7$ is a hydrogen atom or an alkyl radical having from 1 to 6 carbon atoms and A means a bi- to hexavalent aliphatic hydrocarbon radical, is zero or an integer from 1 to 6 and n has the same valency as A.

9. Oxymethylene copolymer having heat and hydrolysis resistant terminal groups prepared according to the process as claimed in claim 1.

* * * * *